June 18, 1957 K. SCHLESINGER 2,796,518

DETECTOR

Filed Oct. 16, 1951

INVENTOR.
Kurt Schlesinger
BY
Norman L. Mueller
Atty.

United States Patent Office 2,796,518

Patented June 18, 1957

2,796,518

DETECTOR

Kurt Schlesinger, Maywood, Ill., assignor to Motorola, Inc., Chicago, Ill., a corporation of Illinois Application October 16, 1951, Serial No. 251,571

4 Claims. (Cl. 250—20)

The present invention relates to wide band detectors and more particularly to an improved gamma controlling video detector circuit for use in television receivers.

The developments of television receiving systems have been directed towards the reduction of the number of circuit components required in the interest of economy, and at the same time have attempted to provide improvement in the overall quality of the reproduced picture. To reduce the number of circuit components it is usually necessary to improve the sensitivity and efficiency of the various circuit stages and components combined to form a television receiver. For example, an improvement in gain of any of the various video signal circuit stages such as the radio frequency amplifying stages, the intermediate frequency amplifiers, the video detector stage, or the video amplifier stage, could enable a reduction in the ultimate number of circuit stages involved in developing the video signal without reducing the signal strength available at the output of the receiver.

The overall quality of the picture reception involves among other things the contrast, sharpness and geometry of the picture as reproduced. Improvements in contrast may be obtained usually by circuits assuring a maximum power output from the video output stage. However, it is a well-known fact that the human eye is more sensitive to changes between the darker light shades such as black and medium shades or grays because the response of the eye to a linear halftone-scale decreases with increasing brightness. In other words, the human eye is less sensitive to gradations of white and gray than to gradations of gray and black. The extent to which the different shades of light values are emphasized in a television system may be indicated by a factor called gamma. The overall gamma of a television receiver system is therefore an indication of its relative contrast characteristic. By controlling the gamma to make the halftone rendition of the receiver non-linear to the extent that highlights and white shadings are accentuated, the characteristic response of the human eye may be compensated with the result of an apparent improvement in contrast of the reproduced picture.

It is, therefore, an object of the present invention to provide an improved video detector circuit having a conversion gain greater than the previously known video detector circuits.

Another object of the present invention is to provide a video detector circuit having a response such that accentuation or emphasis of the signal changes in the white and gray or highlight components of the halftone picture signal is obtained.

Yet another object of the present invention is to provide an improved form of video detector having improved response characteristics and providing automatic limiting control to prevent excessive overloading of the detector.

A feature of the invention is the provision of a triode detector in a modified plate detection circuit which provides improvement in the conversion gain of the video detector and the control of the gamma or picture reproduction. The triode detector tube, according to the invention, is operated on the portion of its response curve at which no grid current is drawn and plate voltage changes are relatively large for lower amplitude video input signals corresponding to white and gray light values, and where grid current is drawn and the plate voltage changes are relatively smaller for video signal changes of greater amplitude corresponding to the darker halftones and black.

Another feature of the present invention is the provision of a triode detector including additional circuit means to limit the amplitude of the video signal applied to the detector so that excessive grid current and the resulting distortion in the detector output is avoided.

Another feature of the invention is in the arrangement for directly connecting the video detector to the video output tube in a circuit whereby a very small plate voltage which is applied through the detector plate load resistance as the only plate voltage on the detector tube is obtained from the plate current circuit of the video output tube such that as the detector signal current increases the applied plate voltage to the detector is reduced to cause the response of the detector to level off for large detected signals.

Further objects and features, and the attending advantages of the present invention will be apparent from a consideration of the following specification and drawing in which.

Figure 1:
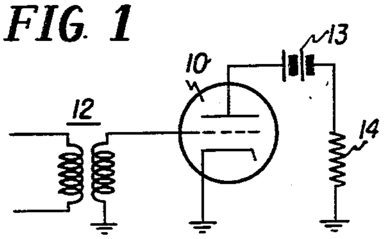
Fig. 1 is a simplified schematic diagram of a triode plate detector in a video circuit.

Briefly stated, the invention teaches the use of a triode detector tube in video detection circuits with the result that both the overall gain and the apparent contrast are increased. The triode tube may be connected in a plate detection circuit operating with a low plate voltage of about 20 volts and having constants such that the tube operates close to cutoff when input signals of low amplitude corresponding to white and gray gradations of the video signal are detected. Under these conditions the plate voltage is not much higher than the maximum signal output. Input signals of higher amplitude cause current partition between grid and plate so that the overall response of the triode video detector decreases for large signals. In the preferred embodiment of the invention, the maximum input signal may be limited by a circuit that is automatically responsive to the flow of grid current in the detector circuit to thus prevent an undesirable amount of distortion in the detector output circuit. Referring to Fig. 1 of the drawing, a triode vacuum tube 10 is shown with its control grid connected to the input signal appearing in the secondary winding of the intermediatae frequency transformer 12. The triode cathode may be grounded and its plate connected to the positive terminal of battery 13 whose negative terminal is grounded through the output load resistor 14. The battery 13 may have a potential of about 20 volts.

Figure 2:
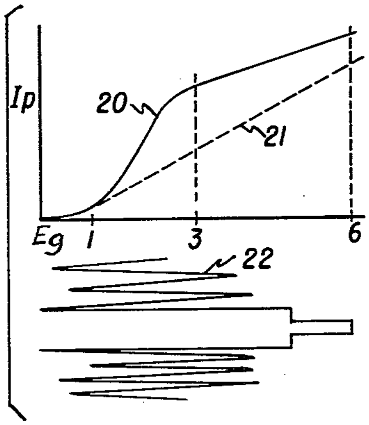
Fig. 2 represents the characteristic response curve of a triode detector to varying amplitude video input signals.

The response of the triode circuit of Fig. 1 to a typical video signal is shown in Fig. 2 wherein the curve 20 is the actual plate current output of the triode detector with the ordinate representing values of plate output ($I_P$) and the abscissa representing values of applied intermediate frequency signal voltage to the grid ($E_g$). It will be seen that the constants of the circuit have been selected such that for applied signals of less than about one volt, the response of the detector is the familiar square law response while for applied signals of one to three volts the response of the detector is substantially linear. For input signals of three to six volts the slope of the detector output, while still linear, decreases, and begins to level off. Such detector response is believed due to the fact that with low plate voltages, the cathode emission begins to be intercepted by the grid for input signals greater than three volts and a condition of operation occurs which may be termed detector saturation. Such saturated detector operation is obtained if the plate voltages are low and it may be caused by a partition of the electron current flow between plate and grid when it becomes positive with respect to the cathode. Grid detection may be prevented by maintaining low impedance in the grid circuit. A typical response curve of the standard diode detector is shown by the dotted line curve 21 and the increased conversion gain of the triode detector is readily apparent, as well as the saturation effect.

Again referring to Fig. 2 and assuming the video signal shown at 22 to have amplitude variations of somewhat less than three to about six volts for white to black signals, respectively, it will be apparent that the changes in slope between the high response portion of the detector characteristic (three volts or less) and the lower response portion (more than three volts), will be effective to produce the desired gamma control by which the brighter gradations near white are enhanced.

Figure 3:
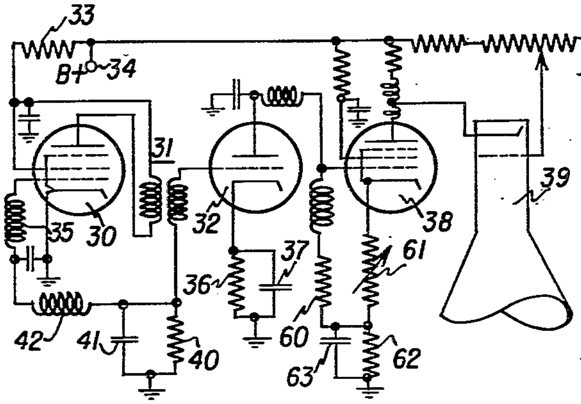
Fig. 3 is a schematic diagram of a preferred embodiment of the invention.

In Fig. 3 of the drawing, a typical application of the invention is illustrated. The amplifier tube 30 of the intermediate frequency output stage has its plate connected through the primary circuit of the transformer 31 whose secondary is connected to the control grid of the triode video detector tube 32. The control grid of the tube 30 receives its signal from the secondary winding 35 of a preceding intermediate frequency transformer and together with the control grid of the triode video detector 32 is returned to ground through a signal limiting circuit 40—41 to be later described in detail.

The cathode of the triode video detector 32 is connected to ground through a conventional self-bias resistor 36 and condenser 37 of sufficient values to obtain the desired operating condition for the detector as previously described in connection with Fig. 2 of the drawing. The plate of the video detector tube 32 is directly connected to the grid of the video output stage 38 whose output in turn is directly connected to the picture tube 39.

The plate voltage for the video detector tube is obtained through the detector plate load resistance 60 connected to the voltage divider comprised of the resistors 61 and 62 in the cathode leg of the video amplifier tube 38. A bypass condenser 63 is connected across resistor 62 and in such manner a plate voltage of about 20 volts is applied to the video detector tube 32.

If desired the condenser 63 may be omitted under which conditions, as the detector output tends to increase, the voltage across resistance 62 decreases to lower the applied plate voltage. This may contribute to the levelling off of the detector output as shown by the curve 20 of Fig. 2.

In order to limit the maximum amplitude of signal applied to the control grid of the triode video detector, and thus prevent excessive grid currents in the detector circuit and consequent distortion and even possible desensitizing of the detector, the detector grid return to ground is made through resistor 40. The voltage developed in resistor 40, due to grid current flow in the video detector 32, is stored in condenser 41 and connected through the radio frequency isolating choke 42 and the secondary 35 to the control grid of the preceding intermediate frequency amplifier tube 30. The direct current voltage developed across resistor 40 is of such polarity as to reduce the gain of tube 30 when applied to its control grid. It is therefore apparent that the output signal of tube 30, which is applied to the control grid of the triode video detector, is automatically limited in amplitude by the flow of grid current in the detector circuit. By selecting suitable values for the circuit components such as resistor 40 and condenser 41 the desired operating range on the response curve of the detector may be obtained and assured by the action of the limiting circuit.

Figure 4:
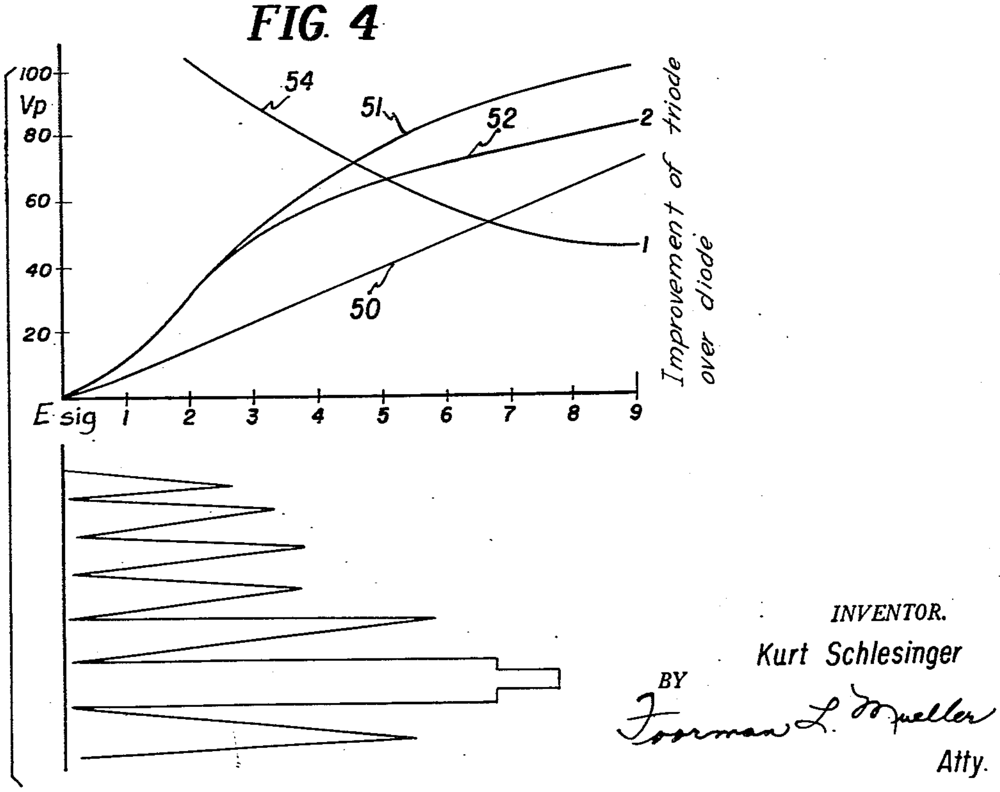
Fig. 4 is a group of curves illustrating the operation of the detector in accordance with the invention.

In Fig. 4 is shown a group of curves illustrating the operation of the circuit of Fig. 3. The ordinate on the left represents voltage on plate of 38 ($V_p$); and the ordinate on the right represents triode over diode improvement. The abscissa represents amplitude values of signal range ($S_{sig}$) from less than three volts to six to eight volts. Curve 50 shows the typical linear response of the conventional diode type of video detector. Curve 51 shows the non-linear response of a triode video detector in accordance with the teachings of this invention, and curve 52 shows the modified non-linear response when using a triode video detector and the limiting circuit of this invention. Curve 54 represents, arbitrarily, the improvement factor in gain of the triode detector over a comparison diode detector.

It is seen from curve 54 that the gain of the triode video detector is about twice that of a linear diode video detector and also that the video detector gain for video signal inputs of lower amplitude corresponding to the brighter light shades is greater than the gain for signals of an amplitude corresponding to dark light shades. Therefore, the video detector circuit of this invention provides both an increase in gain and a control of gamma to increase the apparent contrast of the receiver.

Although a specific embodiment of the invention has been shown and described, it should be understood that various changes and modifications may be made without departing from the spirit and scope of the invention in the appended claims.

I claim:

1. A television receiving circuit including in combination, an intermediate frequency amplifying stage, a video detector stage and a video signal amplifier stage, said intermediate frequency amplifying stage having an input and an output circuit, said detector stage including an electron discharge tube having control grid and plate electrodes, a detector input circuit connecting said control grid electrode to said output circuit of said intermediate frequency amplifying stage, said input circuit including a resistor connected in a series circuit between said control grid electrode and a reference potential, a condenser connected across said resistor, the voltage developed across said condenser and resistor being proportional to grid current flow in said detector stage, means connecting the voltage across said resistor to the input circuit of said amplifying stage in a manner to limit the amplitude of the amplified signal and thereby to limit grid current flow in the detector stage, said video amplifier stage including an electron discharge tube having cathode and control grid electrodes, a single coupling path providing a direct current and an alternating current connection between said plate electrode of said detector electron tube and said grid electrode of said video amplifier electron tube, resistance means connected to said cathode of said video amplifier electron tube for passage of tube current therethrough, and a plate load impedance connecting said plate electrode of said detector electron tube to said resistance means, whereby a relatively low plate potential for said detector electron tube is derived from the current flow through said video amplifier electron tube.

2. A television receiving circuit including in combination, an intermediate frequency amplifying stage, a video detector stage, a video signal amplifier stage, said intermediate frequency amplifying stage having an input and an output circuit, said detector stage including an electron discharge tube having cathode, control grid and plate electrodes, a resistor connected between said cathode electrode and a reference potential for biasing said discharge tube so that no grid circuit flows for small signals and grid current flows for large signals, a detector input circuit connecting said control grid electrode to said output circuit of said intermediate frequency amplifying stage, said input circuit including a resistor connected in series with said control grid electrode and providing a path for grid current flow so that the voltage developed across said resistor varies with the signal applied to said input circuit, means connecting the voltage across said resistor to the input circuit of said amplifying stage in a manner to limit the amplitude of the amplified signal and thereby to limit grid current flow in the detector stage, said video amplifier stage including an electron discharge tube having cathode and control grid electrodes, a single coupling circuit providing a direct current and an alternating current connection between said plate electrode of said detector electron tube and said grid electrode of said video amplifier electron tube, resistance means connected to said cathode electrode of said video amplifier electron tube for passage of tube current therethrough, and a plate load impedance connecting said plate electrode of said detector electron tube to said resistance means, whereby the plate potential for said detector electron tube of the order of 20 volts is derived from the current flow through said video amplifier electron tube.

3. A television receiving circuit including in combination, an intermediate frequency amplifying stage, a video detector stage, a video signal amplifier stage, said video signal amplifier stage including a first electron valve having first, second and third electrodes, an energizing circuit for said first and third electrodes of said first electron valve through which all of the current therefor passes, said energizing circuit including resistor means coupled between said first electrode of said first electron valve and a reference potential point, said video detector stage including a second electron valve having first, second and third electrodes, an input circuit coupled from said intermediate frequency amplifying stage to said first and second electrodes of said second electron valve, and an output circuit for said second electron valve including a load impedance direct current coupled between said third electrode of said second electron valve and a point of said resistor means intermediate said first electrode of said first electron valve and the reference potential point, said output circuit further including a direct current connection to said second electrode of said first electron valve to apply detected signals thereto, whereby energizing potential for said video detector stage is derived from said energizing circuit of said viedo signal amplifier stage and an increase of signal level at said video detector stage increases current flow in said energizing circuit to reduce the response of said video detector stage.

4. A television receiving circuit including in combination, an intermediate frequency amplifying stage, a video detector stage, a video signal amplifier stage, said video signal amplifier stage including a first electron tube having a cathode, a grid and an anode, an energizing circuit for said anode of said first electron valve, said energizing circuit including cathode bias resistor means with a first portion coupled to said cathode of said first electron tube and a second portion series coupled between said first portion and a reference point, means bypassing said second portion of said resistor means at signal frequencies, said video detector stage including a second electron tube having a cathode, a grid and an anode, an input circuit coupled from said intermediate frequency amplifying stage to said cathode and grid of said second electron tube, said input circuit being of low impedance to prevent grid detection of signals, and an output circuit for said second electron tube including a load impedance direct current coupled between said anode of said second electron valve and a point on said cathode bias resistor means intermediate said first and second portions thereof, said output circuit further including a direct current connection to said grid of said first electron tube to apply detected signals thereto, said video detector stage being energized through said output circuit thereof from said energizing circuit for said first valve, with a low potential being applied to said anode of said second valve and conduction therein at high signal levels being divided between said anode and said grid of said second electron tube, said video detector stage providing increased current flow in said energizing circuit at high signal levels to reduce the response of said video detector stage.

References Cited in the file of this patent

UNITED STATES PATENTS

| | | |
|---|---|---|
| 1,910,500 | Roberts | May 23, 1933 |
| 1,926,749 | Mages | Sept. 12, 1933 |
| 2,063,814 | Leonard | Dec. 8, 1936 |
| 2,072,283 | Snow | Mar. 2, 1937 |
| 2,128,996 | Foster | Sept. 6, 1938 |
| 2,141,412 | Schlesinger | Dec. 27, 1938 |
| 2,144,921 | Hunt | Jan. 24, 1939 |
| 2,159,240 | Wheeler | May 23, 1939 |
| 2,334,468 | Adams | Nov. 16, 1943 |
| 2,406,978 | Wendt | Sept. 3, 1946 |
| 2,428,295 | Scantlebury | Sept. 30, 1947 |
| 2,438,960 | Blitz | Apr. 6, 1948 |
| 2,562,476 | Rado | July 31, 1951 |
| 2,653,226 | Mattingly | Sept. 22, 1953 |
| 2,672,505 | Schwarz | Mar. 16, 1954 |